United States Patent [19]
Bove et al.

[11] 3,806,800
[45] Apr. 23, 1974

[54] METHOD AND APPARATUS FOR DETERMINING THE LOCATION OF ELECTRICALLY CONDUCTIVE MEMBERS ON A STRUCTURE

[75] Inventors: Ronald Bove; Eric M. Hubacher, both of Wappingers Falls, N.Y.

[73] Assignee: International Business Machines Corporation, Armonk, N.Y.

[22] Filed: Dec. 26, 1972

[21] Appl. No.: 318,155

[52] U.S. Cl.............. 324/51, 324/66, 324/72.5, 324/158 P
[51] Int. Cl............................................ G01r 31/02
[58] Field of Search........ 324/51, 66, 72.5, 73, 149, 324/52, 158 P, 158 F

[56] References Cited
UNITED STATES PATENTS

| | | | |
|---|---|---|---|
| 3,654,585 | 4/1972 | Wickersham | 324/158 F X |
| 3,528,104 | 9/1970 | Ehlschlager | 324/51 |
| 3,052,842 | 9/1962 | Frohman et al. | 324/66 |
| 2,977,530 | 3/1961 | Cook | 324/51 |
| 3,723,867 | 3/1973 | Canarutto et al. | 324/73 PC |
| 2,887,622 | 5/1959 | Rayburn et al. | 324/158 P |
| 3,217,245 | 11/1965 | Ingmanson | 324/51 |

OTHER PUBLICATIONS

Allen et al., Multicontact Probe, IBM Technical Disclosure Bulletin, Vol. 11, No. 8, January 1969, pp. 1,029–1,030.

Boehringer et al., Electrical Probe Control IBM Technical Disclosure Bull., Vol. 13, No. 6, November, 1970, p. 1,534.

*Primary Examiner*—Gerard R. Strecker
*Attorney, Agent, or Firm*—Frank C. Leach, Jr.; George O. Saile

[57] ABSTRACT

The electrically conductive pads on a semiconductor chip or the engineering change pads on a multilayered substrate are located electronically relative to probes, which are in a predetermined orthogonal orientation, so that the particular probe or probes in engagement with each of the pads is determined. Then, the electrical characteristics of any electrical unit connected to each of the pads is ascertained through selectively controlling the electrical power supplied through the probes to the pads in a controlled manner.

11 Claims, 4 Drawing Figures

METHOD AND APPARATUS FOR DETERMINING THE LOCATION OF ELECTRICALLY CONDUCTIVE MEMBERS ON A STRUCTURE

In testing the functionality of integrated circuits on a monolithic semiconductor chip, probes, which supply electric power from a tester, are used to engage electrically conductive pads, which have the integrated circuits connected thereto, on a chip. To insure that each probe makes contact with a particular pad on the chip, precise alignment of the chip relative to a mechanical contactor having the probes has been required. This alignment is difficult because of the limited spacing between the pads on the chip. Additionally, as the density of the pads on the chip increases so that the pads are closer to each other and are smaller in size, alignment of the pads with the probes becomes even more difficult.

Furthermore, it has been necessary to design each mechanical contactor so that its probes are arranged for use with a chip of a particular design and having its pads at specific locations. If the size of the chip is changed, the location of any pad on the chip is changed, or the size of any pad is changed, for example, a new arrangement of the probes of the mechanical contactor has been required. Thus, any change in the relationship of the pads on a chip has required a new contactor, which is a probe tool, to be designed.

Furthermore, the previously available mechanical contactors have required a specific relationship between the pads whereby the center to center distance between adjacent pads has been most important to insure each of the pads being contacted by the particular probe. Thus, in the previously available mechanical contactors, each probe of the contactor has been designed for engagement with a pad at a specific location on a chip of a specific size.

The universal electronic contactor of the present invention satisfactorily overcomes the foregoing problems by providing an arrangement of the probes wherein alignment of each of the pads on the chip with a specific probe or probes is not required. Additionally, the contactor of the present invention is capable of having its probes engage the pads on the chip irrespective of the arrangement of the pads on the chip as long as the spacing between the pads relative to the size of each of the probes is such that no probe can contact two of the pads simultaneously.

The contactor of the present invention satisfactorily solves the foregoing problems through utilizing a plurality of probes arranged in a predetermined orientation, which is preferably with the probes disposed in an orthogonal grid in which the probes are arranged in rows and columns. By selectively controlling the supply of electrical power to the probes, the location of a first of the pads can be electronically determined. By using a computer programmed for the location of the pads of the particular chip relative to each other, the contactor of the present invention can readily determine the location of all of the pads on the chip. With this programmed information, the computer can supply signals to regulate the supply of power from a tester to various pads in a specific sequence to permit the testing of the integrated circuits connected to the pads on a semiconductor chip.

If the areas of the pads of the chip are large enough to accommodate two of the probes, the contactor of the present invention enables Kelvin testing to be achieved. The Kelvin technique insures more accurate electrical measurements independent of the probe contact resistance. Thus, it is desired to be able to use the Kelvin testing technique in determining the functionality of the electrical units connected to the pads.

Additionally, the contactor of the present invention has AC probing capability because of the relatively short length of each of the probes. Thus, the contactor of the present invention has both AC and DC testing capability.

In addition to testing the functionality of integrated circuits on a semiconductor chip through engagement of the probes of the contactor with the pads of the chip, the previously available mechanical contactors also have been employed to test the electrical interconnections between engineering change pads on a multilayered ceramic substrate. A multilayered ceramic substrate has a plurality of engineering change pads on at least one of its surfaces with the metal layers, which are insulated from each other by the ceramic, providing electrical interconnections between the various engineering change pads.

In testing the interconnections between the engineering change pads on a multilayered ceramic substrate having a large mumber of chip sites such as one hundred chip sites, for example, it has previously been necessary to check the interconnections between the engineering change pads through sequential indexing and alignment of two probe contactors. Each chip site area has a plurality of engineering change pads equal to the number of pads on a semiconductor chip. Thus, for example, if each chip has one hundred pads, then each chip site area would have one hundred engineering change pads.

Accordingly, in testing the engineering change pads at each chip site area, all combinations of interconnections between the engineering change pads at the chip site area with engineering change pads at each of the other chip site areas must be verified. Thus, during testing, one mechanical probe contactor must have its probes engaging each of the engineering change pads for the specific chip site area while a second mechanical probe contactor is sequentially indexed to each of the other chip site areas and has its probes aligned with the engineering change pads at that particular chip site area and the probes of the two contactors selectively connected to a source of power. This indexing and aligning must be repeated for each of the chip site areas so that a relatively long period of time has previously been necessary to test interconnections between engineering change pads on a multilayered ceramic substrate.

The contactor of the present invention satisfactorily solves this problem through having the matrix of the probes encompass the entire one hundred chip site areas. As a result, the engineering change pads are contacted only once during testing so as to reduce the possibility of product damage in comparison with that of the previously available mechanical contactors.

The contactor of the present invention overcomes these problems since there is no requirement of any stepping or indexing equipment or any alignment system. Furthermore, the time for testing is significantly reduced due to the elimination of the stepping or indexing and alignment.

The previously available mechanical contactors for testing the functionality of the interconnections between the engineering change pads of the substrate to ascertain that there is not a short or an open circuit in the interconnection has required each of the probes to contact a specific one of the engineering change pads during a specific test. Since each of the ceramic substrates may have a different shrinkage rate, the engineering change pads are not always located at the exact same position. Accordingly, difficulty has previously existed in attempting to align the probes with the engineering change pads on a multilayered ceramic substrate. By using the contactor of the present invention, this problem is eliminated so that the different shrinkage rates of the ceramic substrates do not present a problem to testing the electrical interconnections between engineering change pads on a multilayered ceramic substrate.

Furthermore, the specific locations between the engineering change pads on a multilayered ceramic substrate, for example, do not have to meet as stringent location manufacturing requirements as has been previously required with the prior mechanical contactors. By using the contactor of the present invention, it is only necessary that the engineering change pads be located relative to each other so that the distance therebetween is greater than the diameter of the probes so that a single probe cannot simultaneously contact two of the engineering change pads.

The same problem also exists with a multilayered ceramic substrate as with a semiconductor chip in that relocation of the engineering change pads has required a new mechanical contactor design having its probes arranged in a different configuration in accordance with the new pad arrangement. The use of the contactor of the present invention eliminates this problem.

With the size of the engineering change pads, the contactor of the present invention is capable of having two of the probes engage each of the engineering change pads. As a result, Kelvin testing can be easily employed with a multilayered ceramic substrate when the contactor of the present invention is employed.

An object of this invention is to provide an apparatus for locating separated electrically conductive members on a support structure relative to predetermined oriented probes with which the members are engaged.

Another object of this invention is to provide a method for determining the positions of separated electrically conductive members on a structure relative to probes arranged in a predetermined orientation.

The foregoing and other objects, features, and advantages of the invention will be more apparent from the following more particular description of the preferred embodiment of the invention, as illustrated in the accompanying drawings.

Figure 1:
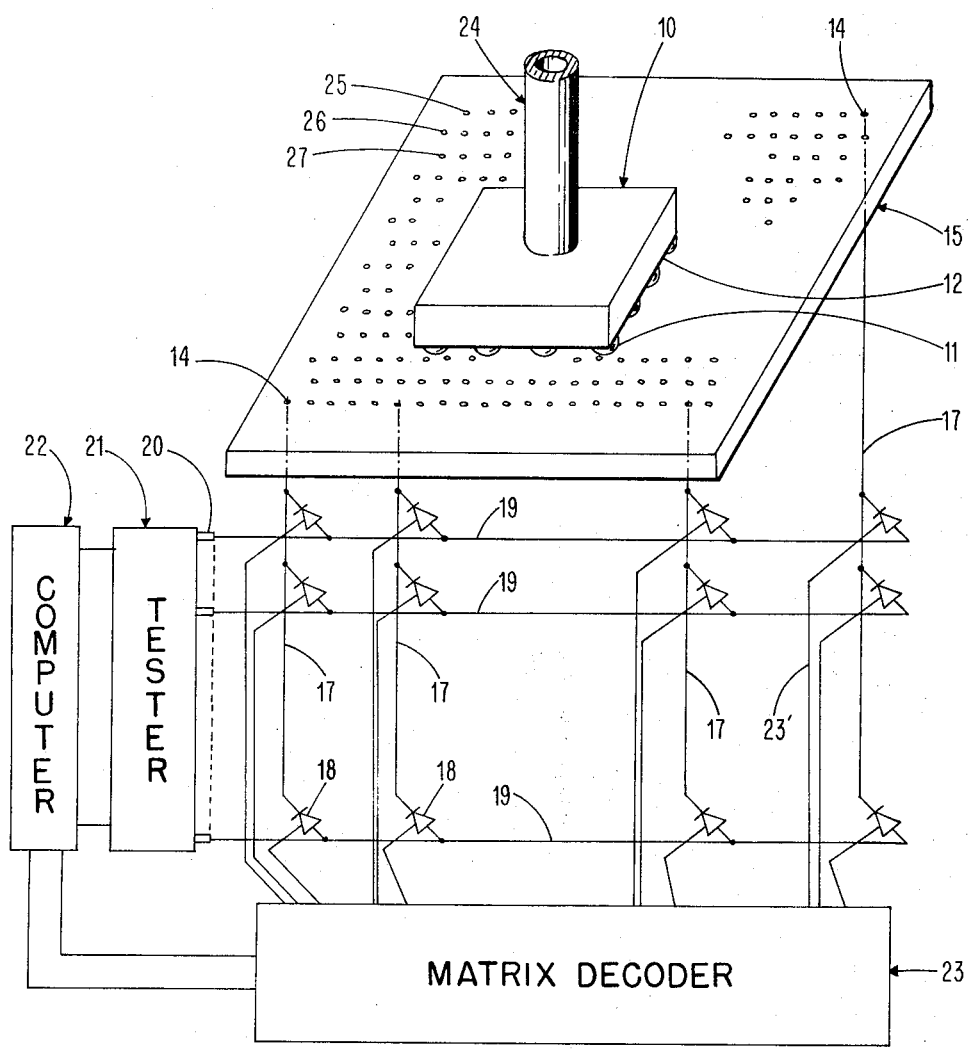
FIG. 1 is a schematic view showing the apparatus of the present invention for locating and testing pads on a semiconductor chip.

Referring to the drawings and particularly FIG. 1, there is shown a semiconductor chip 10 having a plurality of electrically conductive pads 11 extending from its electrically insulating surface 12. Each of the pads 11 may be connected to an integrated circuit (not shown) or a plurality of integrated circuits on the chip 10 with the circuits being disposed beneath the electrically insulating surface 12.

The apparatus of the present invention includes a plurality of probes 14 extending upwardly through an electrically insulating member 15, which may be formed of a plastic, for example. The probes 14 are arranged in an orthogonal grid in which the probes 14 are disposed in a plurality of rows and a plurality of columns.

Each of the probes 14 is capable of sliding within the insulating member 15 when engaged by one of the pads 11. Accordingly, each of the probes 14 slidably extends through an opening 16 (see FIG. 2) in the member 15.

Each of the probes 14 includes a wire 17 extending therefrom and connected by electronic switches 18 to each of a plurality of wires 19. The electronic switches 18 can be silicon controlled rectifiers or transistors, for example.

Each of the wires 19 is connected to a pin 20 of a tester 21. The tester 21 is capable of supplying electrical power of different values to each of the pins 20, which function as a power supply output.

One suitable example of the tester 21 is sold by Fairchild Systems Technology, Inc., Sunnyvale, Calif. as model No. 5,000. The tester can have up to one hundred of the pins 20 so that there would be one hundred of the wires 19 extending therefrom. Thus, each of the wires 17 would have 100 of the electronic switches 18 connected thereto so that each of the wires 17 could be connected to each of the wires 19 when desired.

A computer 22 is connected to the tester 21 and to a matrix decoder 23, which is connected to each of the electronic switches 18 by a separate wire 23'. Accordingly, the computer 22 can supply signals to the matrix decoder 23 to activate one or more of the electronic switches 18 at any time. One suitable example of the computer 22 is an IBM 1800 computer with the matrix decoder 23 being one of the matrix decoders in the IBM 1800 computer.

Figure 2:
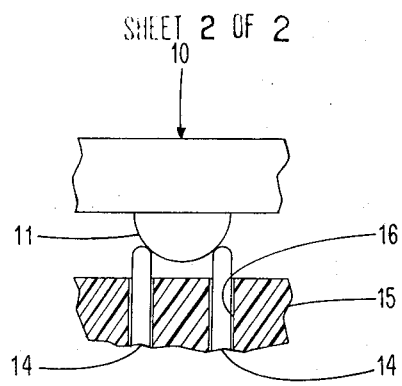
FIG. 2 is an enlarged schematic view showing engagement of a pair of the probes with one of the pads on the semiconductor chip.
Figure 4:
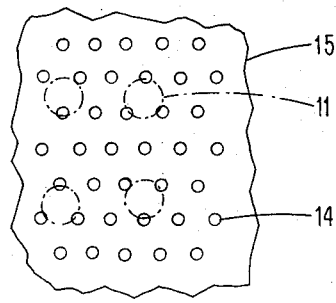
FIG. 4 is a schematic view showing the relationship of the probes to pads on a semiconductor chip.

When the chip 10 is to have the functionality of its integrated circuits tested, the chip 10 is lowered by suitable means such as a vacuum pencil 24 on which it is supported, for example, into engagement with the probes 14. With the probes 14 arranged in an orthogonal grid and using the apparatus of the present invention, the chip 10 can be lowered onto any portion of the grid of the probes 14 as long as all of the pads 11 are on or within the grid of the probes 14. As shown in FIG. 4, for example, each of the pads 11 is engaged by at least two of the probes 14. The contact of two of the probes 14 with one of the pads 11 is shown in FIG. 2.

With the pads 11 in engagement with the probes 14, the computer 22, which is programmed for the location of the pads 11 on the chip 10 being tested, supplies signals to the matrix decoder 23 to connect all of the probes 14 in a row 25 of the grid, for example, to one of the pins 20 and all of the probes 14 in a row 26, which is adjacent the row 25, to another of the pins 20 of the tester 21. Accordingly, by then supplying power through the rows 25 and 26, it can be readily determined if one of the pads 11 is in engagement with the two rows if the tester 21 supplies either a constant voltage or current to the two rows 25 and 26 of the grid of the probes 14. If one of the pads 11 is engaging one of the probes 14 in the row 25 and one of the probes 14 in the row 26 with a constant voltage being applied, then there will be a short between the two rows and a much higher current for a particular constant voltage will occur than if none of the pads 11 is engaging any of the probes 14 in the rows 25 and 26. It should be understood that the current or voltage supplied by the tester 21 is sufficiently small to insure that no damage will occur to the components on the chip 10 if two of the pads 11 are connected to adjacent rows of the probes 14.

If the test shows that none of the pads 11 is engaging any of the probes 14 in the rows 25 and 26 so as to form a short therebetween, then the computer 22 disconnects the electronic switches 18 from the wires 17 connected to the probes 14 in the row 25. Then, the row 26 and a row 27, which is adjacent the row 26, are connected to the two output pins 20 of the tester 21 to which the rows 25 and 26 were connected. The constant voltage is again supplied. With the constant voltage supplied, a short will cause a higher current as previously mentioned.

The testing of adjacent rows in the orthogonal grid of the probes 14 continues until there is a short between two of the adjacent rows. When this occurs, the computer 22 then connects the two left-most probes 14 in one of the two rows having the pad 11 produce a short circuit thereacross. Each two of the adjacent probes 14 are connected to the two output pins 20 through the electronic switches 18, which are controlled from the computer 22 through the matrix decoder 23, until there is a short between two of the adjacent probes 14 in one of the rows. When this occurs, the location of the pad 11 at one of the corners of the chip 10 is ascertained.

With the controlled arrangement of the supply of power to the rows of the probes 14 beginning with the rows 25 and 26 and proceeding through the other rows and then checking from left to right (as viewed in FIG. 1) on a particular row of the probes 14, the pad 11 in the upper left hand corner of the chip 10 should be initially located. With this location and the computer 22 having the pad location and design of the particular chip 10 programmed therein, each of the other pads 11 on the chip 10 may be readily located through the computer 22 connecting various of the electronic switches 18 to the tester 21. If the pads 11 are not properly spaced relative to other of the pads 11, the computer 22 will determine this.

After the location of all of the pads 11 on the chip 10 has been determined, testing of the functionality of the integrated circuits connected to each of the pads 11 is begun. The computer 22 connects the probes 14 through the electronic switches 18 to the particular pins 20 of the tester 21 so that the desired testing of the integrated circuits occurs.

By designing the grid of the probes 14 with the probes 14 so small and closely spaced in relation to the diameter of the pads 11, it is possible that two of the probes 14 will contact one of the pads 11 when the pads 11 are placed in contact with the probes 14. While it is desirable to have two of the probes 14 contact each of the pads 11 on the chip 10, it should be understood that this is not necessary for the apparatus to function satisfactorily. It is only necessary that a sufficient number of the pads 11 be contacted by two of the probes 14 to insure that orientation of the chip 10 is obtained.

If two of the probes 14 engage one of the pads 11 as shown in FIGS. 2 and 4, then the Kelvin technique for measuring the functionality of the integrated circuits connected to the pad 11 can be employed. If only one of the probes 14 is contacting the pad 11, then compensation must be made in the well-known manner for the resistance in the probe 14 and the connecting wires 17 and 19.

Figure 3:
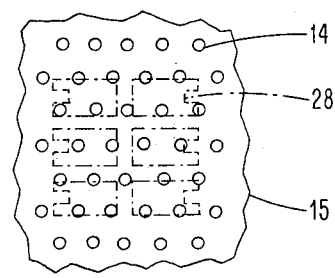
FIG. 3 is a schematic view showing the relationship of the probes to engineering change pads on a multilayered ceramic substrate.

While the probes 14 have been shown in FIGS. 1 and 2 as making contact with the pads 11 on the chip 10, it should be understood that the probes 14 could engage an engineering change pad 28 (see FIG. 3) on a multilayered ceramic substrate. Because of the size of the pads 28 relative to the size and spacing of the probes 14, at least two of the probes 14 will always contact each of the pads 28 as shown in FIG. 3. Accordingly, the Kelvin technique can be employed for testing each of the engineering change pads 28 on a multilayered ceramic substrate.

In selecting the distance between the pads 11 on the chip 10 or the engineering change pads 28 (see FIG. 3) on the multilayered ceramic substrate, it is necessary that the distance between adjacent pads be greater than the diameter of the probes 14. If a non-circular probe were employed, there still must be sufficient spacing between adjacent pads to prevent any shorting therebetween.

While the probes 14 have been shown schematically in FIG. 1, it should be understood that any suitable support arrangement for the probes 14 may be employed as long as the probes 14 are capable of engaging each of the pads 11 on the chip 10 if the pads 11 are of a minimum height. One suitable probe structure for utilization of the apparatus of the present invention is shown and described in the copending patent application of Ronald Bove' for "Probe Contactor Having Buckling Beam Probes," filed Dec. 26, 1972, Ser. No. 318,156, and assigned to the same assignee as the assignee of this application.

When using the probe structure of the aforesaid Bove' application, the computer 22 can determine if one of the pads 11 is missing from the chip 10. If this condition exists, no testing will occur since the chip 10 is defective. Similarly, if one of the pads 11 fails to contact the probes 14 because of lack of sufficient height in comparison with the other of the pads 11 whereby the pad 11 would not be capable of making the connection to a substrate on which the chip 10 is to be supported, then the computer 22 also can recognize this, if the probe structure of the aforesaid Bove' application is employed, and prevent testing of the chip 10 since it is defective.

While the present invention has shown and described the probes 14 as being arranged in an orthogonal grid in which the probes 14 are disposed in rows and columns, it should be understood that any other predetermined orientation of the probes 14 may be employed. It is only necessary that the probes 14 have a predetermined orientation.

In the claims, the use of the term "electrical characteristic" includes both testing of the functionality of the integrated circuits of a semiconductor chip, for example, and the testing of the electrical interconnections between engineering change pads on a multilayered ceramic substrate to ascertain whether the interconnections are open (functional) or shorted (non-functional). The use of the term "electrical unit" in the claims includes an integrated circuit or circuits or the interconnection between a pair of engineering change pads on a multilayered ceramic substrate.

An advantage of this invention is that the same contactor or probe tool may be employed for various chip designs. Another advantage of this invention is that no alignment is required between the probes and the pads on a chip or a multilayered ceramic substrate. Still another advantage of this invention is that all engineering change pads on a multilayered ceramic substrate are contacted only once during testing of the interconnections. A further advantage of this invention is that it eliminates the requirement for any stepping equipment or alignment system for testing the interconnections between the engineering change pads on a multilayered ceramic substrate. Yet another advantage of this invention is that testing is faster and at a lower cost than the previously available equipment. A still further advantage of this invention is that broader tolerances in the relationship of the engineering change pads on a multilayered ceramic substrate may be employed.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A universal electronic aligned contactor including:
   probe means adapted to directly engage each of a plurality of separated electrically conductive members arranged in a predetermined relation on a structure and randomly located relative to said probe means;
   said probe means comprising a plurality of electrically conductive probes disposed in a predetermined orientation uncorrelated to the predetermined relation of the electrically conductive members that are to be directly engaged by said probes and are randomly located relative to said probes when engaging said probes;
   each of said probes being smaller than the distance between adjacent electrically conductive members to prevent any of said probes from engaging adjacent electrically conductive members;
   means to supply electrical power;
   means to selectively connect said power supply means to said probes to determine the location of a first of the randomly located electrically conductive members relative to the predetermined orientation of said probes;
   and means to determine the location of the remainder of the electrically conductive members relative to the predetermined orientation of said probes in accordance with the relation of the electrically conductive members to each other.

2. The contactor according to claim 1 in which the predetermined orientation of said probes comprises an orthogonal grid of said probes arranged in rows and columns.

3. The contactor according to claim 2 in which said determining means includes means to ascertain that the electrically conductive members are located on the structure in the desired arrangement.

4. The contactor according to claim 3 including means to selectively control the connection of said power supply means to said probes to determine the electrical characteristic of any electrical unit connected to each of the electrically conductive members after completion of the location of the electrically conductive members relative to said probes.

5. The contactor according to claim 2 including means to selectively control the connection of said power supply means to said probes to determine the electrical characteristic of any electrical unit connected to each of the electrically conductive members after completion of the location of the electrically conductive members relative to said probes.

6. The contactor according to claim 1 including means to selectively control the connection of said power supply means to said probes to determine the electrical characteristic of any electrical unit connected to each of the electrically conductive members after completion of the location of the electrically conductive members relative to said probes.

7. The contactor according to claim 1 in which said determining means includes means to ascertain that the electrically conductive members are located on the structure in the desired arrangement.

8. A method for locating the position of each of a plurality of separated electrically conductive members arranged in a predetermined relation on a structure and randomly located relative to probes arranged in a predetermined orientation uncorrelated to the predetermined relation of the electrically conductive members with each of the probes having a size so that no probe can engage more than one of the electrically conductive members including:
   disposing the electrically conductive members in direct contact with the probes in a random arrangement with respect to the probes and within the boundary defined by the probes;
   selectively controlling the supply of electrical power to the probes to locate a first of the randomly located electrically conductive members relative to the probes;
   and determining the location of each of the other electrically conductive members relative to the probes in accordance with the relation of the electrically conductive members to each other.

9. The method according to claim 8 in which the predetermined orientation of the probes is an orthogonal grid of the probes arranged in rows and columns and determining the location of the first of the electrically conductive members by initially supplying power to each pair of adjacent rows of the probes until a short is found and then supplying power to each adjacent pair of the probes in each of the pairs of rows having the short until a short is found between an adjacent pair of the probes.

10. The method according to claim 9 including testing electrical units connected to the electrically conductive members after locating the electrically conductive members relative to the probes by selectively supplying electrical power in a controlled arrangement to the probes to test any electrical unit connected to each of the electrically conductive members.

11. The method according to claim 8 including testing electrical units connected to the electrically conductive members after locating the electrically conductive members relative to the probes by selectively supplying electrical power in a controlled arrangement to the probes to test any electrical unit connected to each of the electrically conductive members.

* * * * *